(12) United States Patent
Chen et al.

(10) Patent No.: US 7,912,119 B2
(45) Date of Patent: Mar. 22, 2011

(54) PER-SURVIVOR BASED ADAPTIVE EQUALIZER

(75) Inventors: Weizhong Chen, Austin, TX (US); Leo G. Dehner, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 809 days.

(21) Appl. No.: 11/895,147

(22) Filed: Aug. 23, 2007

(65) Prior Publication Data

US 2009/0052516 A1 Feb. 26, 2009

(51) Int. Cl.
*H03H 7/30* (2006.01)
*H03K 5/159* (2006.01)
*H04L 27/06* (2006.01)
*H04B 1/10* (2006.01)

(52) U.S. Cl. ......... 375/232; 375/229; 375/341; 375/350

(58) Field of Classification Search ............... 375/232, 375/233, 341, 350, 229; 708/300, 322, 323
See application file for complete search history.

(56) References Cited

U.S. PATENT DOCUMENTS

| | | | | |
|---|---|---|---|---|
| 5,872,817 | A * | 2/1999 | Wei | 375/341 |
| 6,304,599 | B1 * | 10/2001 | Igarashi | 375/232 |
| 6,744,814 | B1 * | 6/2004 | Blanksby et al. | 375/232 |
| 7,190,744 | B2 * | 3/2007 | Xia et al. | 375/341 |

OTHER PUBLICATIONS

Frank M. Hsu, "Square Root Kalman Filtering for High-Speed Data Received Over Fading Dispersive HF Channels", IEEE Transactions on Info. Theory, vol. IT-28, No. 5, Sep. 1982, pp. 753-763.
Naofal Al-Dhahir and John M. Cioffi, "Fast Computation of Channel-Estimate Based Equalizers in Packet Data Transmission", IEEE Trans. on Sig. Processing, vol. 43 No. 11 Nov. 1995, pp. 2462-2473.
Zhenhong Li, Olli Piirainen and Aarne Mammela, "An Adaptive RSSE-PSP Receiver With a Pre-filter for EDGE Systems", 2003 IEEE, pp. 3594-3598.
M. Vedat Eyuboglu and Shahid U. H. Qureshi, "Reduced-State Sequence Estimation With Set Partitioning and Decision Feedback", IEEE Trans. on Comm., vol. 36 No. 1 Jan. 1988, pp. 13-20.
Pierre Chevillat, Evangelos Eleftheriou, "Decoding of Trellis-Encoded Signals in the Presence of Intersymbol Interference and Noise", IEEE Trans on Comm vol. 37 No. 7 Jul. 1989, pp. 669-676.
Gottfried Ungerboeck, "Adaptive Maximum-Likelihood Receiver for Carrier-Modulated Data-Transmission Systems", IEEE Trans on Comm, vol. Com-22 No. 5 May 1974, pp. 624-636.
Riccardo Raheli, Andreas Polydoros, Ching-Kae Tzou, "Per-Survivor Processing: A Gen. Appr. To MLSE in Uncertain Enviro.", IEEE Trans on Comm vol. 43 No. 2/3/4 Feb./Mar./Apr. 1995, pp. 354-364.

* cited by examiner

*Primary Examiner* — Betsy L Deppe

(57) ABSTRACT

A method used in an adaptive survivor based channel equalizer, the method comprises selecting at a decision time a survivor in a Viterbi trellis and a corresponding equalizer, adaptively updating at the decision time the corresponding equalizer to define a new corresponding equalizer for use at a next decision time, retrieving the new corresponding equalizer as defined at an earlier decision time, and using the new corresponding equalizer as defined at an earlier decision time as an equalizer for other survivors in the Viterbi trellis at the next decision time. A corresponding adaptive survivor based channel equalizer includes a fixed pre-filter configured to provide a pre-filtered signal to a reduced state sequence estimator (RSSE) which is configured for providing recovered symbols. A coefficient adaptor is coupled to the RSSE and configured to essentially perform the method.

22 Claims, 4 Drawing Sheets

PER-SURVIVOR BASED ADAPTIVE EQUALIZER

RELATED APPLICATIONS

The present application is related to co-pending application Ser. No. 11/726,318, titled ADAPTIVE EQUALIZER FOR COMMUNICATION CHANNELS by Chen, which application is hereby incorporated in its entirety.

FIELD OF THE INVENTION

This invention relates in general to communication equipment and equalizers used in such equipment for equalizing or compensating signals that have been transmitted over communication channels and more specifically to techniques and apparatus for improving per-survivor based adaptive equalizers.

BACKGROUND OF THE INVENTION

Equalizers and adaptive equalizers are often used to compensate for interference or distortions that occur in a signal during transmission over a communication channel including anomalies in the signal that are generated at the transmitter or receiver and over the transmission medium. One common type of interference is generally referred to as InterSymbol Interference (ISI), which denotes the impact on a given symbol that may result from neighboring symbols, normally previously transmitted symbols. ISI may result from various factors, including intentional causes, e.g., transmitter filters used for spectral efficiency or receive filters used for adjacent channel interference reduction, or undesirable and largely uncontrollable causes, e.g., multi-path fading in the channel or transmitter & receiver imperfections.

Multi-path fading distorts a transmitted symbol in both shape as well as symbol duration or length (commonly referred to as dispersion). Communication channels may exist in differing fading environments with the resultant distortion varying significantly. One example of a present communications system that is widely used for various cellular phone communications systems is commonly referred to as EDGE (Enhanced Data rates for GSM Evolution, where GSM is an acronym for the Global System for Mobile Communications). In EDGE signal transmissions, a transmitted symbol pulse lasts for 4 symbol periods. It has been observed that communication over a Hill Terrain (HT) channel or a Rural Area (RA) channel can expand or lengthen the received symbol pulse by 5.4 symbol periods. Additionally, movement between the transmitter and receiver (typically due to a mobile station (MS) traveling relative to base station (BS)) will result in changes in the received symbol pulse over time, with the rate of change being a function of the rate of movement (speed of travel).

Many communication systems, such as an EDGE system utilize a training sequence that is transmitted as part of a burst (collection of a multiplicity of symbols) and in EDGE is located in the middle of the burst. The training sequence allows the receiver at the mobile or base station to estimate the characteristics of the channel (channel estimation). Given the channel estimation various forms of equalizers have been used or proposed which reduce the ISI. Unfortunately such equalizers tend to consume large amounts of processing resources, e.g. processor cycles, memory space, etc., and often have performance limitations when dealing with different combinations of channel complexity (amount of or rates of fading) and signal levels.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns communication equipment and equalizers used therein, e.g., adaptive survivor based equalizers with improved performance and more efficient implementation, i.e., reduction in resources needed for such equalizers. More particularly various inventive concepts and principles embodied in methods and apparatus for adaptive equalization will be discussed and disclosed.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including digital signal processors, possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
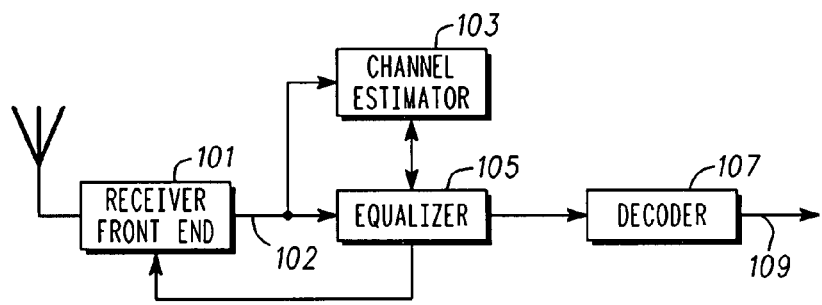
FIG. 1 depicts in a simplified and representative form, a high level diagram of a receiver including an adaptive equalizer in accordance with one or more embodiments.

Referring to FIG. 1, a simplified and representative high level diagram of a receiver including an adaptive equalizer in accordance with one or more embodiments will be briefly discussed and described. FIG. 1, shows a receiver front end 101 that receives a transmitted signal, e.g., from an antenna, and then amplifies, filters, and converts or translates that signal to a lower frequency and normally also converts the resultant analog signal to a digital signal, $x_n$ at 102. The baseband signal, $x_n$, from the receiver front end is coupled to a channel estimator 103 or estimation function as well as a channel equalizer or equalizer 105. The output from the equalizer is provided as soft information (soft bits or symbols, i.e. a symbol together with confidence information) to a decoder 107 that handles error correction, etc, and provides received bits or data that are coupled to further functions, e.g., media access control (MAC), etc. Other receivers may have other configurations in other embodiments.

The baseband signal, $x_n$, received by the receiver can be represented as follows $$x_n = \sum_{i=0}^{L-1} h_i I_{n-i} + \eta_n \quad (1)$$

where $h_n$ is the Composite Channel Pulse Response (CPR) of L symbol periods, including the effects of the transmitted symbol pulse, multi-path fading, and receiver filters; $I_n$ is the information sequence, and $\eta_n$ represents the combination of Additive White Gaussian Noise (AWGN), co-channel interferences and adjacent channel interferences. In, e.g., an EDGE signal transmission, the length of the CPR can be as long as 9.4 symbol periods in harsh fading, such as Hilly Terrain (HT) and Rural Area (RA) as defined in 3GPP standards.

Figure 2:
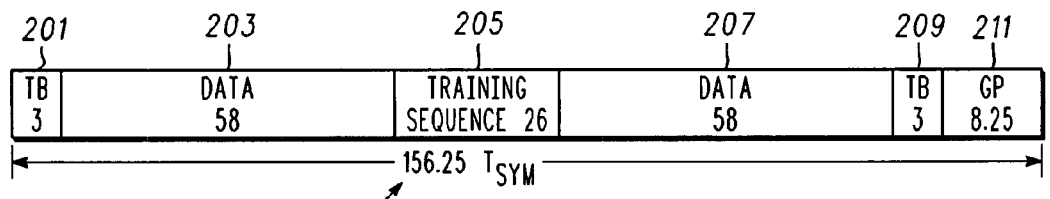
FIG. 2 depicts a diagram of bit allocation in an exemplary EDGE burst transmission.

Referring additionally to FIG. 2, a diagram of symbol allocation in an exemplary EDGE burst transmission will be briefly discussed and described and used to further describe the channel characterization and equalizer of FIG. 1 and others. FIG. 2 shows one burst in an EDGE system. It is understood that other systems and air interface standards may have other allocation maps. The EDGE burst occupies or has a duration of or spans 156.25 symbol periods 200. In EDGE, each burst duration is equivalent to 577 micro-seconds. As shown, the EDGE burst includes and spans 3 tail symbols 201, a first data field 203 that includes or spans 58 symbols, a training sequence 205 of 26 symbols, a second data field 207 that includes or spans 58 symbols, 3 more tail symbols 209, followed by a gap 211 equivalent to 8.25 symbols times. The training sequence is a predetermined sequence of symbols or bits as specified in the relevant standards, e.g., EDGE standards. As is known and specified in the various air interface standards for EDGE systems, 8 bursts comprise one Time Division Multiplex Access (TDMA) frame, which is transmitted via one radio frequency carrier. Different TDMA frames may be frequency hopped on different radio frequency carriers. Twenty-six (26) TDMA frames comprises one multiframe. Fifty-one multiframes are included in a superframe and 2048 superframes are included in a hyperframe.

The channel estimator 103 or estimation process estimates the composite CPR $h_n$ from the received signal $x_n$ corresponding to the training sequence and the known training sequence $I_n$ 205 for each transmitted and thus received burst, via the relationship in equation (1) using one or more generally known techniques, e.g., Minimum Mean Square Error (MMSE) or Weighted MMSE. The equalizer 105, given the channel estimation from the channel estimator, generally operates or functions to remove or reduce distortion or interference in the received symbols or bits. The training sequence by being placed in the middle of a burst allows information symbols closest to the training sequence to facilitate reduction of the impact of channel variations over or during the burst. With this arrangement of the training sequence, the equalizer can operate or adjust or compensate in both directions, i.e., from the training sequence to or across earlier received data or the first data field 203 as well as from the training sequence to or across later received data or the second data field 207, and thereby better account for channel variations over the time duration or span of the received signal burst (or burst of the received signal).

One technique that may be used to recover the information sequence, $I_n$, from the received or baseband signal, $x_n$, as corrupted with ISI and AWGN is known as Maximum Likelihood Sequence Estimation (MLSE) using a Viterbi Algorithm (VA). However, the complexity of VA increases exponentially as the length of CPR $h_n$ increases or modulation symbol set grows. For high order modulation, such as 8PSK in EDGE, and a CPR $h_n$ that can exceed 9 taps, the complexity becomes impractical for most devices.

Figure 3:
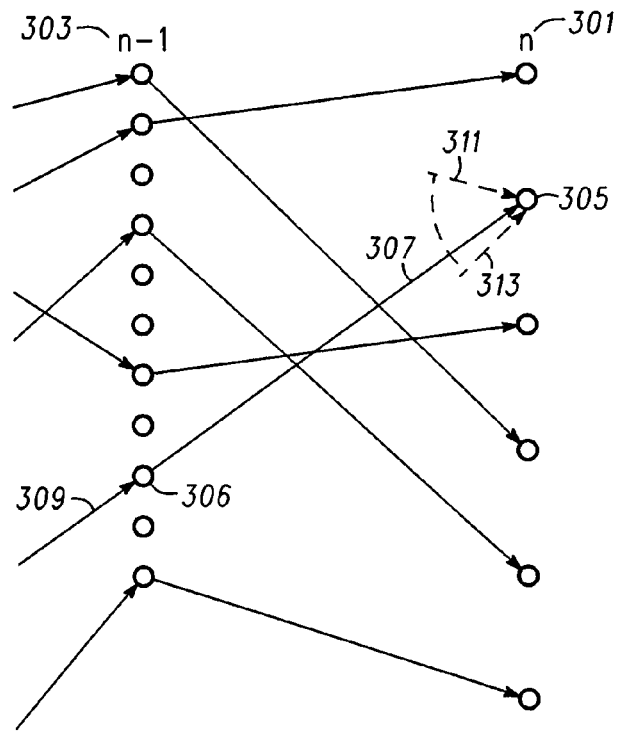
FIG. 3 depicts a diagram of a portion of an exemplary Viterbi trellis which will serve to illustrate various processes in accordance with one or more embodiments.

Referring to FIG. 3, a diagram of a portion of an exemplary Viterbi trellis which will serve to illustrate various processes in accordance with one or more embodiments will be discussed and described. FIG. 3 shows a portion of a Viterbi trellis that illustrates the VA. A full Viterbi trellis normally shows points in time, n 301, n−1 303, (two shown) along a horizontal axis or dimension. These points in time may be referred to or thought of as decision times and typically correspond to symbol times for a given air interface or modulation scheme. The dots or small circles are representative of states, e.g., state 305, within the Viterbi trellis and underlying system. A full trellis will have all possible states at each decision time. The lines in FIG. 3 represent state transitions from one time to another time and are often referred to as branches. A state transition is the result of a system input, i.e., a symbol being transmitted and received. Thus a branch represents one or more symbols that would cause the transition from the state 306 where the branch 307 originates at an earlier time, n−1 303 to the state 305 where the branch 307 ends at the current time, n 301.

In particular the solid lines in FIG. 3 are surviving branches or survivors, e.g., surviving branch 307. A surviving path or survivor at a given state and decision time n 301 is the combination of surviving branches as traced back via the surviving branches, e.g., branch 307+309, through the trellis. Generally the Viterbi Algorithm includes for each state calculating a cumulative error for each branch arriving at that state and selecting as the survivor at that state, the branch and hence survivor or surviving path with the best, e.g., lowest, cumulative error. Thus at state 305, time n, a cumulative error was determined for each of branches 311 . . . 307 . . . 313 and based on the best cumulative error, branch 307 was chosen as the survivor and any other branches 311 . . . 313 were trimmed or dropped. At each state there will be only one surviving branch entering that state; however there may be more than one surviving branch leaving a state, at least temporarily. Because of the large number of states and branches emanating from each state (during the application of the VA), the memory required to remember the cumulative error at each state and resources to update these errors for each branch at typical symbol rates makes the utilization of MLSE via the VA impractical in many instances.

Figure 4:
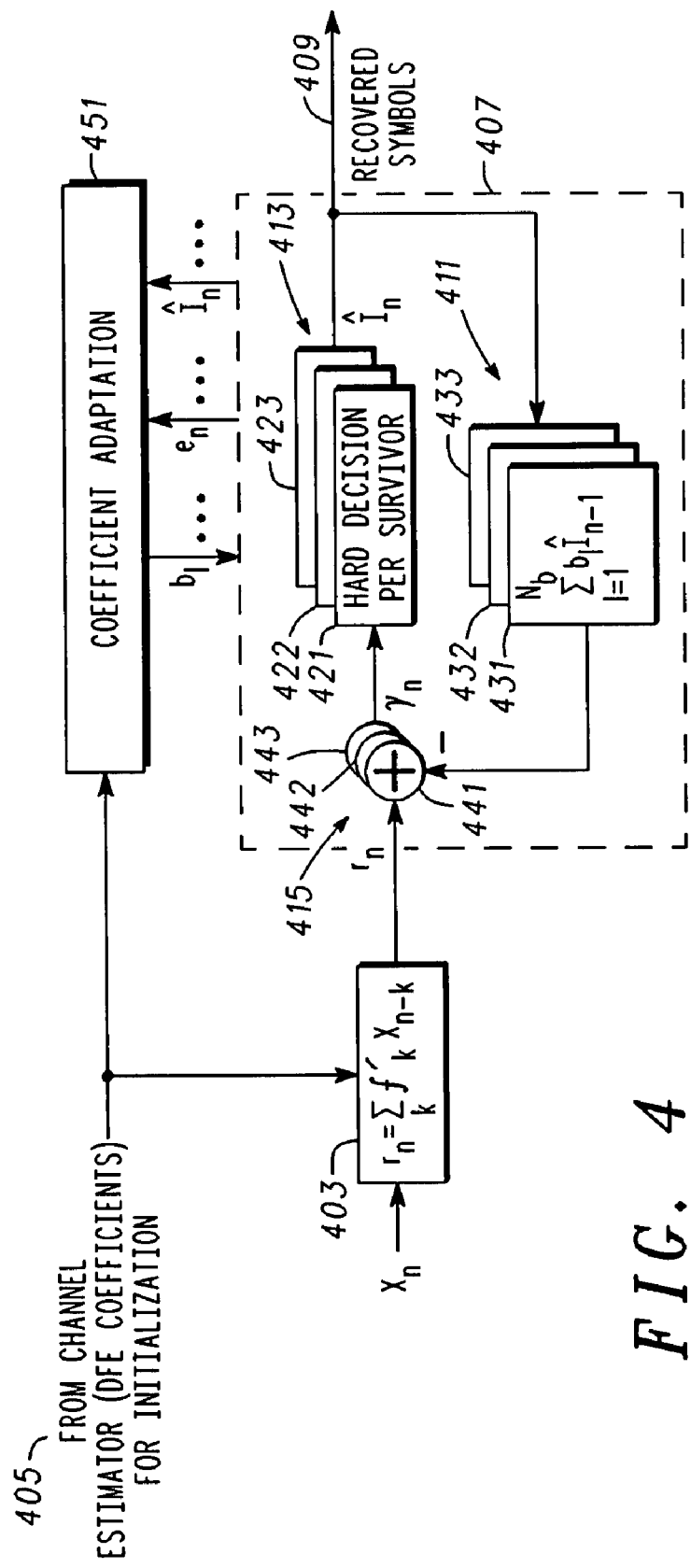
FIG. 4 depicts a representative high level block diagram of an adaptive channel equalizer in accordance with one or more embodiments.
Figure 5:
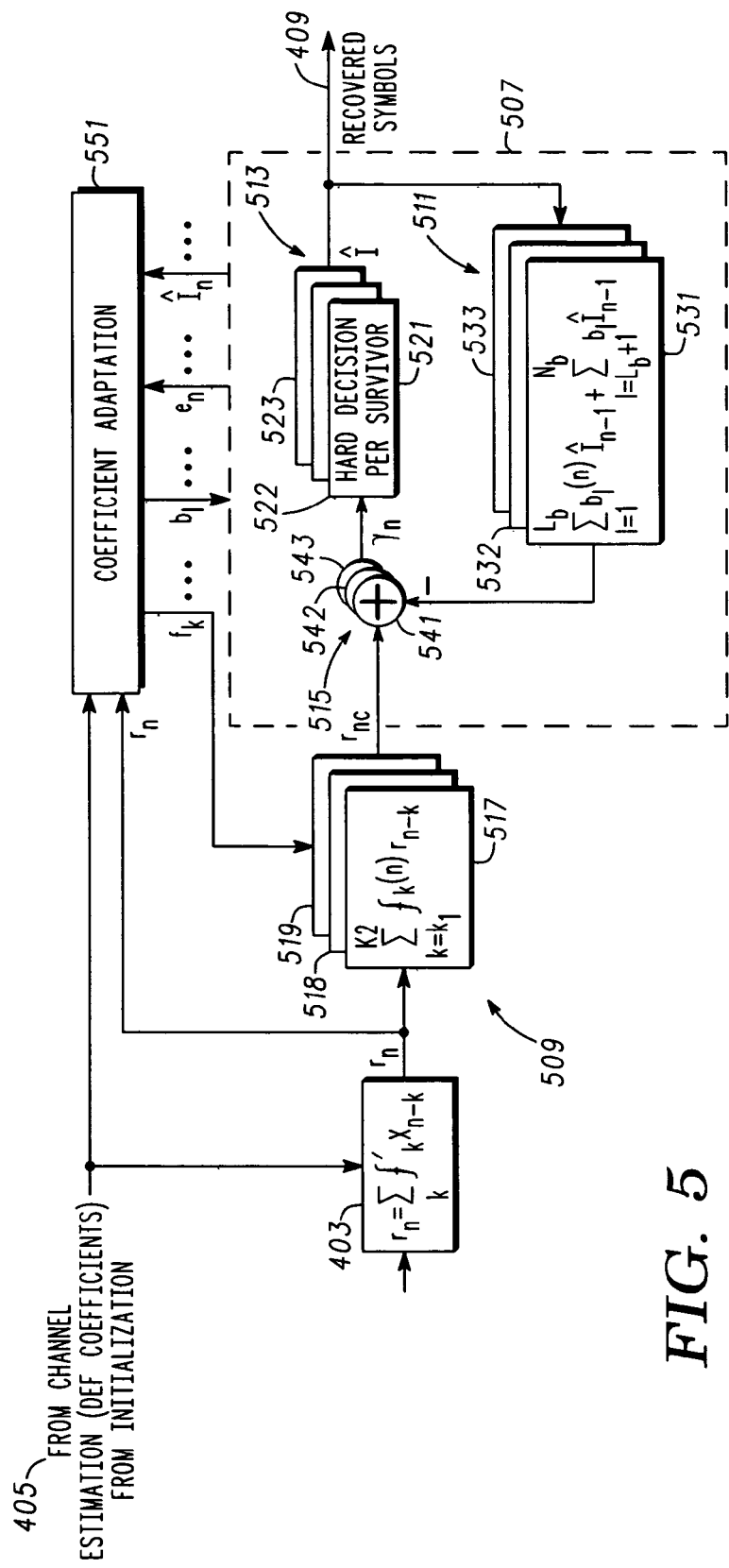
FIG. 5 depicts a representative high level block diagram of an adaptive channel equalizer in accordance with one or more additional embodiments.

To reduce the complexity of MLSE, a Decision Feedback Equalizer (DFE) has been developed, in which the CPR $h_n$ is first converted into a CPR $\{b_n, n=0, 1, 2, \ldots, N_b\}$ of minimum phase, or close to minimum phase, with $b_0=1$ by a pre-filter $f_n'$, sometimes called feed-forward filter (see FIG. 4, 403; FIG. 5, 403), so that the information sequence $I_n$ can be recovered in a decision directed fashion. In practice $N_b$ is somewhat of a tradeoff between appropriate performance and complexity. In some embodiments a value of 6 for $N_b$ has been found to be appropriate. The process of calculating the coefficients for the feed forward filter is known and may be referred to as DFE coefficient calculation. This may be or may be viewed as performed as part of the channel estimator 103 functions.

In a DFE implementation, the received signal $x_n$ is first filtered with the feed forward filter or pre-filter $f_n'$ 403 and the result $r_n = x_n * f_n'$ can be represented as follows $$r_n = I_n + \sum_{k=1}^{N_b} b_l I_{n-l} + w_n \qquad (2)$$

Thus the information sequence $I_n$ can be estimated in a decision directed fashion by $$y_n = r_n - \sum_{l=1}^{N_b} \hat{I}_{n-k} b_l \qquad (3)$$

where $y_n$ is the soft symbol and the $\hat{I}_n$ is the hard symbol determined from $y_n$. The hard symbol estimate at symbol time n, $\hat{I}_n$ is simply selected from the symbol alphabet as the symbol closest to $y_n$. The DFE approach is essentially reflected in a simplified version of FIG. 4 (see feed forward filter 403, combiner 415, hard decision 421, and feed back filter 431).

DFE has an error-propagation problem, which causes significant performance degradation when the received signal $x_n$ experiences fading. This can be seen from (3) where an error in the symbol estimate at time n will impact results for $N_b$ following symbols. To mitigate the error propagation problem with DFE, the MLSE principle can be applied to the pre-filter output signal $r_n$. To reduce the complexity of conventional MLSE, Reduced State Sequence Estimator (RSSE) has been developed that takes advantage of the minimum phase property of the remaining CPR $b_n$ in the pr-filtered signal $r_n$. These concepts are discussed in, e.g.,] M. V. Eyuboglu, and S. U. H. Qureshi, "Reduced-State Sequence Estimation with Set Partitioning and Decision Feedback," *IEEE Transactions on Communications*, Vol. 36, No. 1, January 1988, pp. 13-30 and P. R. Chevillat and E. Elefitheriou, "Decoding of Trellis-Encoded Signal in the Presence of Intersymbol Interference and Noise," IEEE Trans. Communication, Vol. COM-37, pp. 669-676, July 1989.

RSSE can include two portions of state reduction. In the first portion of the state reduction, the ISI contribution due to the first few taps of the CPR $b_n$ is compensated by MLSE and the ISI contribution due to the rest of the taps is compensated with DFE. The second portion of the state reduction applies a technique called set partitioning for high order modulation, such as 8PSK in EDGE, to the MLSE to further reduce the number of states. With set partitioning, a symbol alphabet is portioned into groups using an Ungerboeck principal. This principle is known and discussed, e.g., in G. Ungerboeck, "Adaptive Maximum Likelihood Receive for Carrier Modulated Data-Transmission System," IEEE Trans. Communication, Vol. COM-22, pp. 624-636, May, 1974.

The search trellis with this set partitioning is built for the groups, rather than for the elements in the symbol alphabet and the trellis search is essentially to determine which group the transmitted symbols belong to. To track channel changes over time due, e.g., to fading and RF front-end LO error, adaptive DFE, adaptive MLSE and per-survivor based adaptive MLSE/RSSE have been developed. The per-survivor based adaptive MLSE/DFE is discussed, e.g., in R. Raheli, A. Oplydoros and C-K. Tzou, "Per-Survivor Processing: A General Approach to MLSE in Uncertain Environments," *IEEE Transactions on Communications*, Vol. 43, No. 2/3/4, February/March/April 1995, pp. 354-364 and in Zhenhong Li, O. Piirainen, A. Mammela, "An Adaptive RSSE-PSP Receiver with a Pre-Filter for EDGE System," 2003, ICC '03. *IEEE International Conference on Communications*, Vol. 5, 11-15 may 2003, pp. 3594-3598.

Adaptive DFE uses the difference between observation and the model prediction based on the current CPR $b_n$ and estimated information sequence available so far to update the CPR $b_n$ for the next step of information sequence estimation. The difference can be represented as follows:

$$e_n = r_n - \sum_{l=0}^{N_b} b_l^{n-1} \hat{I}_{n-l} \qquad (4)$$

where $b_l^{n-1}$, $n=0, 1, \ldots, N_b$ is the current CPR; $\hat{I}_n$, $n=-\infty, \ldots, n$ is the estimated information sequence available so far; and $r_n$ is the observation of the pre filter signal. In matrix form, Equation (4) can be written as $$e_n = r_n - C'(n)Y(n) \qquad (5)$$

where $$C(n) = \begin{bmatrix} b_0^{n-1} \\ \vdots \\ b_{N_b}^{n-1} \end{bmatrix} \text{ and } Y(n) = \begin{bmatrix} \hat{I}_n \\ \vdots \\ \hat{I}_{n-N_b} \end{bmatrix} \qquad (6)$$

The CPR C(n) can be updated either by LMS (Least Mean Squares) approach or RLS (Recursive Least Squares) approach. With LMS approach, the CPR C(n) is updated as follows $$C(n+1) = C(n) + \beta e_n Y^*(n) \qquad (7)$$

where $\beta$ controls the tracking speed. With RLS approach, the CPR C(n) is updated as follows $$\mu_n = Y'(n)P(n-1)Y^*(n) \qquad (8)$$

$$K(n) = \frac{1}{\beta + \mu(t)} P(n-1)Y^*(n)$$

$$P(n) = \frac{1}{\beta}[P(n-1) - K(n)Y'(n)P(n-1)]$$

$$C(n) = C(n-1) + K(n)e_n$$

Where C(0) is initialized with the initial CPR $b_n$ and P(0) is initialized as a diagonal matrix of appropriate dimension.

Note that herein C(n), since it includes all coefficients for the adaptive filter of FIG. 4 may alternatively be referred to as an equalizer for a corresponding survivor.

It is shown that the CPR adaptation (7) or (8) relies on the estimated information sequence $\hat{I}_n$, thus the channel adaptation in DFE is a decision directed channel adaptation. The performance of this decision directed channel adaptation relies on the accuracy of the decision. Whenever there is an error in the decision of the information symbols, that error affects the next information symbol recovery, thus causing error propagation.

To overcome the error propagation problem, adaptive MLSE and per-survivor based adaptive MLSE/RSSE have been proposed. The key difference between adaptive MLSE and per-survivor based adaptive MLSE/RSSE is in how the channel is adapted in conjunction with the Viterbi search, instead of state reduction. Both of them use the same decision directed channel adaptation. However, in adaptive MLSE, one channel adaptation is made at each stage of trellis pruning for all survivor paths based a tentative data decision determined from the strongest surviving path. In terms of channel adaptation, adaptive MLSE simply provides a better estimated data sequence than DFE for the decision directed channel adaptation, yet at the price of a decision delay that will cause degradation in the branch metric calculation in the Viterbi trellis search. In per-survivor based adaptive MLSE/RSSE, however, each survivor has its own channel adaptation based on the tentative data decision over its own survivor. In per-survivor based adaptive MLSE/RSSE, all survivors are in the trial, including the best data estimate, thus no decision delay is needed. However, per-survivor based adaptive MLSE/RSSE requires N times of operations and memory for channel adaptation where N is the number of states of the search trellis. From the discussion above, the number of states can be reduced using Ungerboeck principals.

Referring to FIG. 4 a representative block diagram of an adaptive channel equalizer in accordance with one or more embodiments will be discussed and described. It will be observed that FIG. 4 shows in part an adaptive survivor or per-survivor based equalizer or MLSE/RSSE equalizer. This equalizer comprises a fixed pre-filter 403 configured to be coupled to a receive signal $x_n$ and provide a pre-filter or pre-filtered signal $r_n$, where this pre-filter is configured via coefficients (DFE coefficients) 405 which are provided from the channel estimator 103. Note that for each burst in an EDGE signal, these DFE coefficients will normally be determined once for left hand and once for right hand movement through and away from the training sequence. The adaptive channel equalizer is similar to equalizer 105 although varying embodiments can include some of the functionality of the equalizer with the channel estimator 103.

Further included in the equalizer of FIG. 4 is a reduced state sequence estimator (RSSE) 407 coupled to the pre-filter signal and configured for providing recovered symbols at 409. The RSSE 407 includes an adaptive feedback filter 411 which is configured to extend each survivor in a Viterbi trellis at a first time, e.g., n−1, to a second time, e.g., n, where the survivor and corresponding symbol estimates for that survivor are represented or provided by the per Survivor hard decision function 413. FIG. 4 shows the combiner 415 comprising combiners 441, 442, 443, the hard decision function 413 comprising functions 421, 422, 423 and the feedback filter 411 comprising feedback filters 431, 432, 433. This symbolizes the repetition of these functions for each survivor in a corresponding Viterbi trellis. In practice this may be 16, 32, 64 or more states and corresponding survivors.

Additionally included is a coefficient adaptor 451 coupled to the RSSE and configured; to adaptively update first coefficients for the adaptive feedback filter used for first equalizers associated with a first portion of survivors at the first time, and to assign second coefficients for the adaptive feedback filter used for second equalizers associated with a second portion of the survivors at the first time, the second coefficients being first coefficients for the adaptive feedback filter used for one or more of the first equalizers at an earlier time that precedes the first time. At a given time or decision time n, the coefficient adaptor selects a portion, i.e., one or more of all survivors, and updates the associated equalizers {C(n−1) becomes C(n)} for these survivors (provides new or updated coefficients for the feedback filter) using equations (7) or (8) and the estimated symbols $\hat{I}_n$, associated with the respective survivor. The coefficient adaptor 451 selects one or more of the survivors where the corresponding equalizers have been updated and the equalizers for that one or more survivors from an earlier decision time, e.g., C(n−d) where d can be 1, 2, 3, etc., and assigns this equalizer to a second portion of the survivors at time n. The recovered symbols are provided at 409 upon completion of the Viterbi trellis trimming where the details of doing so are not specifically shown since they are generally known.

The coefficient adaptor 451 is provided with an error $e_n$ for each survivor where this error term is determined in accordance with (4) and together with $\hat{I}_n$, for each survivor used to update some equalizers C(n) for one or more survivors in accordance with (7) or (8). Note that the error term is the difference between the output $y_n$ of the combiner and the symbol estimates $\hat{I}_n$ for or corresponding to each survivor. As is known in a Viterbi trellis branch error metrics are calculated for each branch arriving at a state and these branch error metrics are added to a cumulative error metric that is associated with the originating state to provide a new cumulative error metric for each branch arriving at the present state. Only the best or strongest branch is saved at a state and all other branches and corresponding paths are dropped or pruned or trimmed. The branch error metric can be the magnitude or square of the magnitude of the error $e_n$. Thus the coefficient adaptor 451 can also handle the Viterbi trellis trimming, etc. The coefficient adaptor 451 provides the updated equalizers, i.e., coefficients $b_j$ for the feedback filter or adaptive feedback filter where the coefficients are determined on a per-survivor basis (using estimated symbols in accordance with the survivor).

One or more embodiments of the coefficient adaptor or equivalent functionality is configured to sort error metrics to provide a sorted error metrics list, where each error metric is associated with one survivor in the Viterbi trellis at the present decision or symbol time. The first equalizers can then be determined in accordance with the sorted error metrics list. In some embodiments, the coefficient adaptor is configured to select a strongest survivor based on a best error metric (normally the smallest error metric) from the sorted error metrics list and adaptively update first coefficients for the adaptive feedback filter used for an equalizer associated with the strongest survivor. In some embodiments, the coefficient adaptor is configured to select additional survivors (part of the first portion) based on the sorted error metrics list and adaptively update first coefficients for the adaptive feedback filter used for additional equalizers associated one for one with the additional survivors. In at least some instances, the coefficient adaptor is configured to choose the additional survivors based on the sorted error metrics list where the additional survivors have associated error metrics, which are next best error metrics after a strongest survivor with a best error metric has been chosen. The coefficient adaptor can be configured to assign the second coefficients for the adaptive feedback filter used for the second equalizers wherein the second coefficients are first coefficients at one decision time earlier. In some embodiments, the coefficient adaptor will select the equalizer (corresponding coefficients) associated with the strongest survivor at d decision times earlier, where d=1, i.e., coefficients associated with C(n−1) for the strongest survivor and assign these coefficients and thus equalizer to all of the second portion of the survivors. Note that the second portion of the survivors may include all except the strongest survivor.

Referring to FIG. 5, a representative high level block diagram of an adaptive channel equalizer in accordance with one or more additional embodiments will be discussed and described. FIG. 5 shows a novel structure for a per survivor based adaptive equalizer. At a block diagram level FIG. 5 is similar to FIG. 4 with the addition of an adaptive feed forward filter 509 and a different adaptive feedback filter 511. The adaptive feedback filter 511 only adapts a portion, 1 ... $L_b$, of the $N_b$ feedback filter coefficients as may be observed in FIG. 5. The adaptive channel equalizer of FIG. 5 is analogous to the equalizer 105.

It has been observed that different channel coefficients carry different order of channel variations. Channel adaptation on un-changed or less changed channel coefficients not only requires unnecessary complexity and calculations, but can also actually be harmful for performance. Because of this observation, the novel structure of data-aided channel adaptation shown in FIG. 5 was developed. This structure can be equally well applied to adaptive DFE, adaptive MLSE, and per-survivor based adaptive MLSE/RSSE. The difference between the conventional data-aided channel adaptation and the novel structure of data-aided channel adaptation is in the structure of the adaptation. In the novel channel adaptation structure, only one or a few more channel coefficients are adapted, and the rest of the channel coefficients are not adapted. The error calculation in the general form of the novel structure can be given as follows:

$$e_n = \left(I_n + \sum_{i=L_b+1}^{N_b} I_{n-l} b_l\right) - C'(n)Y(n) \quad (9)$$

where $$C(n) = \begin{bmatrix} f_{K_1}^{(n-1)} \\ \vdots \\ f_0^{(n-1)} \\ f_1^{(n-1)} \\ \vdots \\ f_{K_2}^{(n-1)} \\ b_1^{(n-1)} \\ \vdots \\ b_{L_b}^{(n-1)} \end{bmatrix} \text{ and } Y(n) = \begin{bmatrix} r_{n-K_1} \\ \vdots \\ r_n \\ r_{n+1} \\ \vdots \\ r_{n+K_2} \\ I_{n-1} \\ \vdots \\ I_{n-L_b} \end{bmatrix} \quad (10)$$

and adaptation of C(n) can be performed using (7) or (8) above. It is noted that C(n) includes all of the coefficients that define the adaptive filters shown in FIG. 5. Thus C(n) may be referred to or viewed as the equalizer associated with a given survivor in the discussions below.

The simplest case of the novel structure is when $K_1=0$, $K_2=0$, and $L_b=0$, in which only one coefficient $f_0^{n-1}$ in the adaptive feed forward filter is adapted. In this instance matrix calculation in (7) and (8) are reduced to scalar calculations, resulting in dramatic complexity reduction. However, it is noticed that the simplest case provides dramatic performance gain in complex and fast fading channels specified in 3GPP relative to known approaches. Meanwhile the simplest case does not cause degradation in slow fading and static conditions and causes slight degradation only in complex and fast fading relative to those with optimal choice of $K_1$, $K_2$, and $L_b$. An extended discussion regarding the selection of these parameters is provided in co-pending application Ser. No. 11/726,318 which was referred to above and has been included herein by reference.

As described with reference to FIG. 4 and as will become apparent for FIG. 5, a further complexity reduction for the per-survivor based adaptive RSSE with negligible performance compromise even in complex and fast fading environments is available with the principles discussed and described herein. The complexity reduction is achieved by reducing the number of equalizers to be adapted, yet still using the per-survivor adaptation principle. The number of equalizers to be adapted in each stage of trellis pruning can be as low as one with the new structure of data-aided channel adaptation.

In conventional adaptive MLSE/RSSE, at each stage of trellis pruning or trimming, the strongest survivor is determined, and the sequence up to the current stage on the strongest survivor is thus determined. This may be called a tentative data sequence denoted as $\hat{I}_n$, n=−∞, ..., n−1, n, where n represents the current stage of pruning. A portion of the tentative data sequence, $\hat{I}_n$, n=−∞, ..., n−d, and the received signal $r_{n-d}$ are then used to update the channel, resulting in updated channel $b_k^{n-d}$, k=0, 1, 2, ..., $N_b$, where d is the decision delay. The decision delay d is critical for the adaptive MLSE/RSSE to be successful since the strongest surviving path is a premature solution at the current stage of trellis pruning. The updated equalizer $b_k^{n-d}$, k=0, 1, 2, ..., $N_b$ will be applied to the next step of trellis pruning at stage n+1. Thus even if the tentative data sequence is correct, and the adapted channel is correct at time n−d, it may not be correct for the update at time n+1. For slow fading, the performance degradation due to this time delay may not be significant. However, for fast fading the performance impact can be significant since the updated channel $b_k^{n-d}$, k=0, 1, 2, ..., $N_b$ will be applied to branch metric calculations at d symbols late in the Viterbi trellis search. To mitigate the impact by reducing the delay d will lead to using premature tentative data sequence for the channel adaptation. Therefore, adaptive MLSE/RSSE has a fundamental limitation for fast fading channels. Per-survivor based adaptive MLSE/RSSE will remove or mitigate this fundamental limitation.

To overcome the problems associated with the adaptive MLSE/RSSE, per-survivor based adaptive MLSE/RSSE has been proposed, in which the data sequence associated with each survivor is used for the data-aided channel adaptation. Therefore, for an N-state MLSE/RSSE, N sets of equalizers are updated, one for each survivor. The updated channel associated with a survivor is used for the extension of that survivor. The rational behind the per-survivor based adaptation is that whenever incomplete knowledge of the channel prevents us from accurately calculating an error or transition metric in trellis pruning, the channel on each survivor is updated based on the data sequence associated with the survivor leading to that transition. Since one of the survivors is correct, the channel adaptation associated with that survivor is made using the correct data sequence. In other words, the best survivor is extended using the best data sequence available regardless of our temporary ignorance as to which survivor is the best.

The challenge with the per-survivor based adaptive MLSE/RSSE is that N equalizers are adapted independently at each stage of trellis pruning for an N-state MLSE/RSSE. For a 64-state RSSE, a set of 64 equalizers are updated at each stage of trellis pruning, and memory required is the space to store 64 equalizers and associated update information. Thus per-survivor based adaptive MLSE/RSSE encounter big challenges in many applications, especially in handhold mobile devices. An efficient solution with negligible performance compromise is highly desirable for many practical applications.

Returning to FIG. 5, a receive signal $x_n$ is coupled to the feed forward (fixed, non adaptive) filter 403 which is configured with DFE coefficients from the channel estimator at 405 and which provides a pre-filtered signal $r_n$ that is coupled to an RSSE 507 (via adaptive feed forward filter 509) and which is configured to provide recovered symbols at 409 and which includes an adaptive feedback filter 511 (shown as per survivor adaptive feedback filters 531, 532, 533). The adaptive feedback filter 511 is configured and operable to extend each survivor in a Viterbi trellis (corresponding symbols) at a first time to a second and subsequent time. The RSSE 507 is intercoupled to a coefficient adaptor 551 and provides error metrics $e_n$ corresponding to each branch or at least each surviving branch within the Viterbi trellis. The coefficient adaptor 551 is initialized for each half burst by the DFE coefficients, etc. from the channel estimator at 405 and is configured to provide $b_l$ coefficients for the adaptive feedback filter 511 and also handles adaptation of these coefficients for $l=1, 2, \ldots, L_b$ and the adaptation of $f_k$ feed forward filter coefficients.

More specifically the pre-filtered signal is coupled to an adaptive feed forward filter 509, shown as adaptive filters 517, 518, 519 (symbolic of an adaptive feed forward filter for each survivor in a Viterbi trellis). The adaptive feed forward filter is configured to compensate the pre-filter signal and couple the pre-filter signal as compensated to the RSSE. The adaptive feed forward filter 509 provides a signal $r_{nc}$, which is a compensated pre-filtered signal or the pre-filtered signal as compensated, e.g., for amplitude and phase variations due largely to channel fading, to a combiner 515 (shown as combiners 541, 542, 543). The combiner 515 combines the pre-filtered signal as compensated and the output signals from the adaptive feed back filter 511 to provide a respective $y_n$ for each survivor in a Viterbi trellis. The per-survivor estimated symbols or symbol sequence $\hat{I}_n$ is provided by a decision function 513 (shown as functions 521, 522, 523) to the adaptive feedback filter 511.

Similar to FIG. 4, an error $e_n$ and $\hat{I}_n$ is provided for each survivor to a coefficient adaptor 551. The error $e_n$ is determined from equation (9) and (10) and is utilized together with $\hat{I}_n$ and $r_n$ by the coefficient adaptor to adaptively update, via equation (7) or (8), first coefficients for the adaptive feedback filter used for first equalizers associated with a first portion of survivors at the first time, and to assign second coefficients for the adaptive feedback filter used for second equalizers associated with a second portion of the survivors at the first time, the second coefficients being first coefficients for the adaptive feedback filter used for one or more of the first equalizers at an earlier time that precedes the first time. The coefficient adaptor 551 has similar functionality to that discussed above with reference to FIG. 4 and coefficient adaptor 451; however, for the survivors among the first portion, fewer of the adaptive feedback filter coefficients are updated and the adaptor also updates one or more coefficients $f_k$ for the adaptive feed forward filter 509. Generally for the adaptive feed back filter 511 only the first $L_b$ coefficients are updated, where in some embodiments, $L_b$ can be as small as 0 (meaning no adaptation for feed back filter), with the remaining coefficients, $L_b+1, \ldots, N_b$, remain set to their initial value as provided from the channel estimator.

In one or more embodiments, the coefficient adaptor is further configured to adaptively update first filter coefficients for the adaptive feed forward filter 509 used for the first equalizers associated with the first portion of survivors at the first time and to assign second filter coefficients for the adaptive feed forward filter used for the second equalizers associated with a second portion of the survivors at the first time, where the second filter coefficients can be first filter coefficients for the adaptive feed forward filter used for one or more of the first equalizers at the earlier time. Similar to the FIG. 4, the coefficient adaptor 551 is configured to sort error metrics to provide a sorted error metrics list, where each error metric is associated with one survivor in the Viterbi trellis, and where the first equalizers are determined in accordance with the sorted error metrics list. The coefficient adaptor can be configured to select a strongest survivor based on a best error metric from the sorted error metrics list (normally survivor with the smallest error or cumulative error metric) and adaptively update first coefficients for the adaptive feedback filter and adaptively update first filter coefficients for the adaptive feed forward filter, where both filters are used for an equalizer associated with the strongest survivor. In addition to the strongest survivor, the coefficient adaptor can be configured to select additional survivors based on the sorted error metrics list (next best error metrics or the like) and adaptively update first coefficients for the adaptive feedback filter and adaptively update first filter coefficients for the adaptive feed forward filter, both filters used for additional equalizers associated one for one with the additional survivors.

It will be evident from the above and further elaborated on below that a dramatic reduction in the memory and computational resources associated with the per-survivor based adaptive MLSE/RSSE is provided by the equalizers of FIG. 4 and FIG. 5. As generally noted above, these equalizers only update $N_{track}$ equalizers on $N_{track}$ most likely survivors (strongest and next strongest, etc survivors), where $N_{track}$ can be as small as 1. For the remainder of the survivors, their corresponding equalizers are not adaptively updated (equation (7) and (8) are not calculated for the remaining equalizers); but rather assigned the equalizer from the one or more of the strongest survivors at d symbols earlier as determined at the current stage n, where d can be as small as 1. $N_{track}$ determines the number of equalizers to be updated in each stage of trellis pruning; and d determines the memory requirement to save $(d+1)N_{track}$ equalizers. For 8PSK in EDGE using the data-aided channel adaptation of the new structure (9) and (10), it is found that $N_{track}$ can be as small as 1, and d can be as small as 1, which means only one equalizer needs to be updated in each stage of trellis pruning and memory required is the storage to store two equalizers and associated adaptive information $\{C(n), P(n), C(n-1), P(n-1)\}$.

Figure 6:
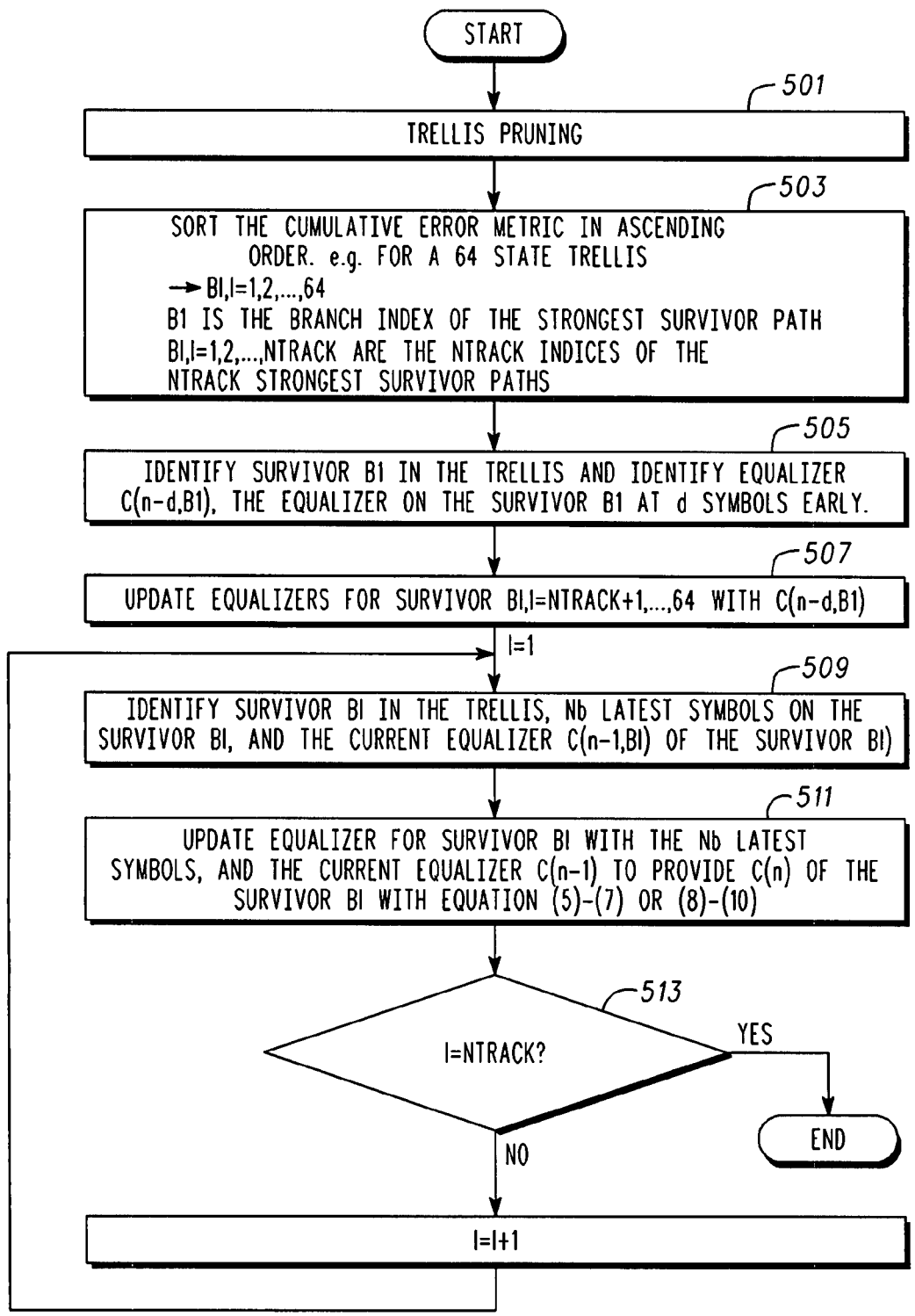
FIG. 6 illustrates a flow chart of one detailed method embodiment of updating per survivor based equalizers, such as those in FIG. 4 and FIG. 5 in accordance with one or more embodiments.

Referring to FIG. 6, a flow chart of one detailed method embodiment of updating per survivor based equalizers, such as those in FIG. 4 or FIG. 5 in accordance with one or more embodiments will be discussed, described and generalized upon. Generally the method begins and shows trellis pruning 501 taking place. As noted above all branches that end at a state for a decision or symbol time n, are compared in terms of an associated cumulative error metric and only the strongest of these branches and their associated surviving path is saved with all other branches and their associated paths being trimmed, or pruned, or dropped.

The method of FIG. 6 is used in an adaptive survivor based channel equalizer and generally includes selecting at a decision time n, a survivor in a Viterbi trellis 501, 503, where the survivor has a corresponding equalizer C(n−1), i.e., as defined at an immediately earlier decision time, adaptively updating at the decision time n the corresponding equalizer (and possibly other equalizers) 509, 511 to define the corresponding equalizer C(n) for use at a next decision time; retrieving the corresponding equalizer as defined at an earlier decision time C(n−d) 505; and using the corresponding equalizer as defined at an earlier decision time as an equalizer 507 for other survivors in the Viterbi trellis at the next decision time.

More specifically, assume we just finished trellis pruning for a 64-state RSSE at symbol index n, resulting in 64 survivors, and 64 corresponding cumulative path error metrics $M_{cm}^n(l)$, l=1, 2, . . . , 64. Note that the same or similar process is used for a 16 or 32 state RSSE. The adaptation for these 64 equalizers under the per-survivor processing principle is made as follows. Sort the 64 cumulative metrics 503 in ascending order, resulting in $B_l$, l=1, 2, . . . , 64, which holds the indices of the 64 survivors in an ascending order in terms of cumulative error metric saved in $M_{cm}^n(l)$, l=1, 2, . . . , 64. $B_1$ is the index of the smallest cumulative path error metric, thus the index of the strongest survivor of the 64 survivors. $B_l$, l=1, 2, . . . , $N_{track}$ are the indices of the $N_{track}$ strongest survivors. Identify the strongest survivor $B_l$, and identify equalizer C(n−d,B1), the equalizer on survivor B1 at d symbols earlier 505. Identify survivors $B_l$=$N_{track}$+1, . . . , 64, i.e., all except $N_{track}$ strongest survivors, and update their equalizers with the equalizer C(n−d,B1) 507.

Identify the strongest survivor $B_l$ starting with l=1, the Nb latest symbols on the survivor $B_l$, and the current equalizer C(n−1, $B_l$) associated with the survivor $B_l$, where C(n−1, $B_l$) was used to provide $e_n$ for the latest branch error metric and thus present cumulative error metric for that survivor $B_l$ 509. Update the equalizer for survivor $B_l$ with the Nb latest symbols, latest error $e_n$ and the current equalizer C(n−1, $B_l$) to provide C(n, $B_l$) using equations (5), (6) and (7) or (8) or equations (9), (10), and (7) or (8) 511 and repeat 509, 511 for other strongest survivors until 1=$N_{TRACK}$ 513. Generally 509, 511, 513 result in updating $N_{track}$ equalizers on the $N_{track}$ strongest survivors corresponding to indices $B_l$, l=1, 2, . . . , $N_{track}$. For each of the $N_{track}$ equalizer adaptations, first search back on the survivor path to identify the $N_b$ latest symbols on the survivor path, where $N_b$ is the number of the feedback taps in the feed back filter for the equalizer. The $N_b$ latest symbols are then used to update the adaptive coefficients given in the vector C(n) with the appropriate equations.

Although not specifically shown the $N_{track}$+1 equalizers and update information P(n) will need to be saved in memory, where $N_{track}$ equalizers are just updated, and 1 equalizer is the one inherited C(n−d, B1). The method of FIG. 6 can be repeated as needed for additional decision times n+1, n+2, etc. and can be implemented is a suitable DSP or other integrated circuit with appropriate processing resources.

The flow chart of FIG. 6 in general terms illustrates a method that includes sorting or rank ordering error metrics, where each error metric is associated with one survivor in a Viterbi trellis, to provide a sorted error metrics list and then selecting a survivor, i.e., strongest survivor or the like in accordance with the sorted error metrics list. The survivor that is selected will typically be the strongest survivor or survivor with a best error metric based on the sorted error metrics list. The method also illustrates selecting or choosing one or more additional survivors in accordance with the sorted error metrics list and adaptively updating at the decision time the additional equalizers, where the additional equalizers correspond one to one to the additional survivors. The one or more additional survivors are typically selected as those one or more additional survivors that have associated error metrics, which are next best error metrics after a strongest survivor with a best error metric has been selected. Furthermore retrieving the new corresponding equalizer as defined at the earlier decision time can comprises retrieving the new corresponding equalizer as defined at the decision time C(n−1, B1). As noted above the Viterbi trellis can be a 64, 32, 16, etc. state trellis and the other survivors can be all survivors other than the strongest survivor. Updating or adaptively updating at the decision time the corresponding equalizer further comprises updating feed forward filter coefficients for FIG. 5 embodiments and feedback filter coefficients for FIG. 4 and FIG. 5 embodiments based on the symbols corresponding to the survivor, e.g., symbols as traced back along the survivor.

The rational behind this efficient solution is as follows. In the Viterbi trellis search for a MLSE/RSSE with large search trellis, at the end of each stage of trellis pruning, not all survivors have the same likelihood to lead to the final survivor at the next stage of trellis pruning. The cumulative metrics of these survivors contain some information regarding which ones of them are more likely than others. In the efficient solution, the $N_{track}$ equalizers on the $N_{track}$ most likely survivors are updated with the per-survivor processing principle (using symbols from that survivor), and the equalizers on the rest survivors are updated with the best of the possible equalizers with slight delay (d symbols). If none of the survivors outside the $N_{track}$ most likely survivors is elevated to the $N_{track}$ most likely survivors at the end of next stage of trellis pruning, no performance degradation should be expected. If one of the survivors outside the $N_{track}$ most likely survivors is elevated to one of the $N_{track}$ most likely survivors in next stage of the trellis pruning, the impact of the delay associated with that equalizer in current stage will be removed during the coefficient adaptation at the end of next stage of trellis pruning. Therefore, the impact of decision delay associated with this efficient solution will not be accumulated. Thus, no performance degradation is observed with this efficient per-survivor based MLSE/RSSE in moderate fading speed such as in TU50 and HT50 and only slight degradation is observed in fast fading such as RA250. The degradation in RA250 is about 1 dB relative to full scale of per-survivor based RSSE, which gains more than 10 dB with the new adaptive RSSE structure of FIG. 5.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method used in an adaptive survivor based channel equalizer, the method comprising:

selecting at a decision time a survivor in a Viterbi trellis, the survivor having a corresponding equalizer defined at an immediately earlier decision time;

adaptively updating at the decision time the corresponding equalizer to define the corresponding equalizer for use at a next decision time;
retrieving, from memory, the corresponding equalizer as defined at an earlier decision time; and
using the corresponding equalizer including associated coefficients as defined at said earlier decision time as an equalizer including the associated coefficients for other survivors in the Viterbi trellis at the next decision time.

2. The method of claim 1 further comprising sorting error metrics, each error metric associated with one survivor in the Viterbi trellis, to provide a sorted error metrics list and wherein the selecting the survivor comprises selecting the survivor in accordance with the sorted error metrics list.

3. The method of claim 2 wherein the selecting the survivor further comprises selecting a strongest survivor with a best error metric based on the sorted error metrics list.

4. The method of claim 2 further comprising choosing one or more additional survivors in accordance with the sorted error metrics list and adaptively updating at the decision time one or more additional equalizers, the one or more additional equalizers corresponding one to one to the one or more additional survivors.

5. The method of claim 4 wherein the choosing the one or more additional survivors in accordance with the sorted error metrics list further comprises selecting one or more additional survivors that have associated error metrics, which are next best error metrics after a strongest survivor with a best error metric has been selected.

6. The method of claim 1 wherein the retrieving the corresponding equalizer as defined at the earlier decision time further comprises retrieving the corresponding equalizer as defined at the immediately earlier decision time.

7. The method of claim 1 wherein the Viterbi trellis is a 64 state trellis and the other survivors comprise 63 survivors.

8. The method of claim 1 wherein the Viterbi trellis is a 32 state trellis and the other survivors comprise 31 survivors.

9. The method of claim 1 wherein the Viterbi trellis is a 16 state trellis and the other survivors comprise 15 survivors.

10. The method of claim 1 wherein the adaptively updating at the decision time the corresponding equalizer further comprises updating feed forward filter coefficients and feedback filter coefficients based on the symbols corresponding to the survivor.

11. An adaptive survivor based channel equalizer comprising:
a fixed pre-filter configured to be coupled to a receive signal and provide a pre-filter signal;
a reduced state sequence estimator (RSSE) coupled to the pre-filter signal and configured for providing recovered symbols, the RSSE including an adaptive feedback filter configured to extend each survivor in a Viterbi trellis at a first time to a second time; and
a coefficient adaptor coupled to the RSSE and configured:
to adaptively update at the first time first coefficients for the adaptive feedback filter, the adaptive feedback filter defined by the first coefficients included with and used for first one or more equalizers associated with a first portion of survivors, and
to assign at the first time second coefficients for the adaptive feedback filter, the adaptive feedback filter defined by the second coefficients included with and used for second equalizers associated with a second portion of the survivors, the second coefficients being first coefficients for the adaptive feedback filter used for one or more of the first one or more equalizers at an earlier time.

12. The adaptive survivor based channel equalizer of claim 11 wherein the coefficient adaptor is configured to sort error metrics to provide a sorted error metrics list, each error metric associated with one survivor in the Viterbi trellis, the first one or more equalizers determined in accordance with the sorted error metrics list.

13. The adaptive survivor based channel equalizer of claim 12 wherein the coefficient adaptor is configured to select a strongest survivor based on a best error metric from the sorted error metrics list and adaptively update first coefficients for the adaptive feedback filter, the adaptive filter defined by the first coefficients included with and used for an equalizer associated with the strongest survivor.

14. The adaptive survivor based channel equalizer of claim 13 wherein the coefficient adaptor is configured to select additional survivors based on the sorted error metrics list and adaptively update first coefficients for the adaptive feedback filter, the adaptive filter defined by the first coefficients included with and used for additional equalizers associated one for one with the additional survivors.

15. The adaptive survivor based channel equalizer of claim 14 wherein the coefficient adaptor is configured to choose the additional survivors based on the sorted error metrics list where the additional survivors have associated error metrics, which are next best error metrics after a strongest survivor with a best error metric has been chosen.

16. The adaptive survivor based channel equalizer of claim 11 wherein the coefficient adaptor is configured to assign the second coefficients for the adaptive feedback filter used for the second equalizers wherein the second coefficients are first coefficients at one decision time earlier.

17. The adaptive survivor based channel equalizer of claim 11 further comprising an adaptive feed forward filter configured to compensate the pre-filter signal to provide a compensated pre-filter signal and couple the compensated pre-filter signal to the RSSE and wherein the coefficient adaptor provides filter coefficients to the adaptive feed forward filter.

18. The adaptive survivor based channel equalizer of claim 17 wherein the coefficient adaptor is further configured:
to adaptively update at the first time first filter coefficients for the adaptive feed forward filter used for the first one or more equalizers associated with the first portion of survivors; and
to assign at the first time second filter coefficients for the adaptive feed forward filter used for the second equalizers associated with a second portion of the survivors, the second filter coefficients being first filter coefficients for the adaptive feed forward filter used for one or more of the first one or more equalizers at the earlier time.

19. The adaptive survivor based channel equalizer of claim 18 wherein the coefficient adaptor is configured to sort error metrics to provide a sorted error metrics list, each error metric associated with one survivor in the Viterbi trellis, the first one or more equalizers determined in accordance with the sorted error metrics list.

20. The adaptive survivor based channel equalizer of claim 19 wherein the coefficient adaptor is configured to select a strongest survivor based on a best error metric from the sorted error metrics list and adaptively update first coefficients for the adaptive feedback filter and adaptively update first filter coefficients for the adaptive feed forward filter, both filters used for an equalizer associated with the strongest survivor.

21. The adaptive survivor based channel equalizer of claim 19 wherein the coefficient adaptor is configured to select additional survivors based on the sorted error metrics list and adaptively update first coefficients for the adaptive feedback filter and adaptively update first filter coefficients for the adaptive feed forward filter, both filters used for additional equalizers associated one for one with the additional survivors.

22. The adaptive survivor based channel equalizer of claim 11 wherein the coefficient adaptor configured to adaptively update at the first time the first coefficients is further configured to adaptively update the first coefficients by calculating new first coefficients based on previous coefficients and an error.

* * * * *